E. DELAFOND.
MANUFACTURE OF SUGAR DIRECT FROM THE JUICE.
APPLICATION FILED JULY 24, 1920.
1,371,997.  Patented Mar. 15, 1921.
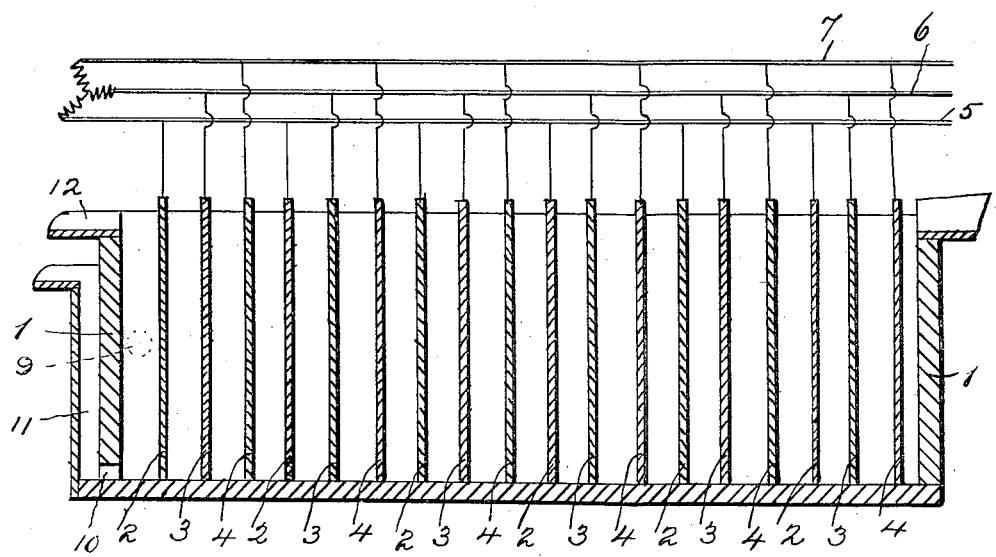
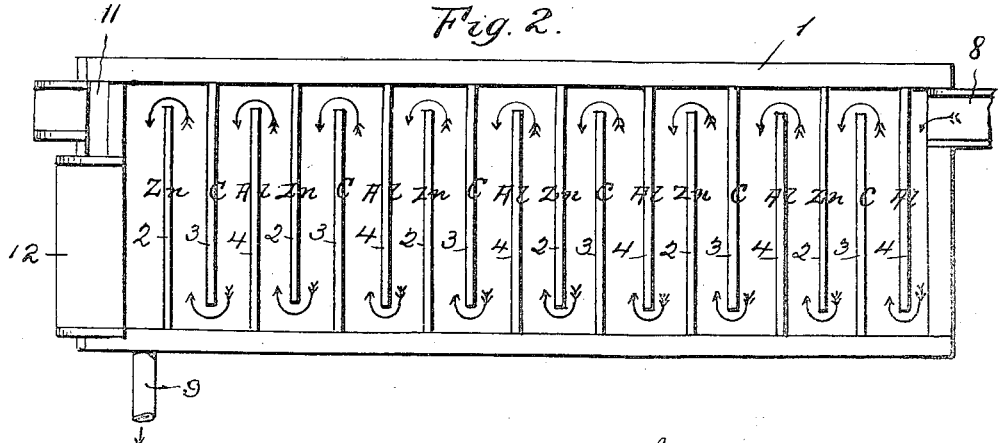
Inventor
Elie Delafond
By Henry Orth
Atty

UNITED STATES PATENT OFFICE.

ELIE DELAFOND, OF HABANA, CUBA.

MANUFACTURE OF SUGAR DIRECT FROM THE JUICE.

1,371,997. Specification of Letters Patent. Patented Mar. 15, 1921.

Application filed July 24, 1920. Serial No. 398,758.

*To all whom it may concern:*

Be it known that I, ELIE DELAFOND, a citizen of the United States of America, residing at Habana, Cuba, have invented certain new and useful Improvements in the Manufacture of Sugar Direct from the Juice; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

I have discovered that raw cane juice, either before or after defecation, when subjected while in motion to alternating electric currents of low voltage will have its yield in sugar greatly increased, the soluble solids will be rendered insoluble and be precipitated with the suspended solids, and the organic matters will float as a scum.

In practical operation the raw undefecated juice runs between electrodes supplied with low voltage direct or alternating current or three-phase current. The electrodes are placed in a trough, staggered, so that the juice will take a zigzag course. The rate of flow of the juice is quite rapid, sufficient in all cases to prevent deposition of any salts on the electrodes. Sediment is constantly withdrawn from the end of the trough at the bottom, scum from the top and clarified juice from the intermediate level.

The sediment is conveniently led to settling tanks, decanted, and residue pressed or filtered to recover any remaining juice, or I may run the whole product to a sand filter and obtain a clear juice at once.

The juice is then converted into massecuite and crystallized.

Partly concentrated juices or primary syrups may be treated in the same manner, especially syrups from the evaporators for the elimination of iron salts resulting from the attack of the syrup in the evaporating pans.

Tests before and after treatment with large quantities of juices show the following:

Before treatment, 81.15 Brix=69 sucrose, 85.02 purity; after treatment, 79.30 Brix= 71.25 sucrose, 89.84 purity.

The electrodes should preferably be of different material.

The juice or syrup should not be in contact too long with the electrodes, that is, should not be subjected to electric current for much more than five minutes maximum, when employing a current of from six to ten volts and a total amperage of from ten to sixty amperes, giving a current density in the neighborhood of from one one-hundredth to two one-hundredths of an ampere per sq. cm.

If the voltage drops much below six volts there is a decided decrease in separation, and if the voltage is too high the electrolyte will heat, with an immediate decrease in separation, as also will be the case when the current density rises above about ten amperes per sq. cm. which breaks down the sucrose into glucose.

The electrodes that I have used are carbon, zinc, aluminum, lead and other metallic plates of a thickness sufficient to be easily handled and installed in a trough and to be self supporting.

After months of use I have not perceived any wear of the surfaces of the electrodes.

If the circulation movement of the liquid is too slow or is stopped, the electrodes become coated with precipitate or slimes and the purification is retarded.

In the annexed drawings I have illustrated one form of a very simple apparatus for carrying out my invention, in which I have chosen to use three phase alternating current, and in which—

Figure 1 is a vertical section, and

Fig. 2 a plan view.

For the purposes of illustration only I have chosen to illustrate the apparatus as equipped with zinc, carbon, and aluminum.

The apparatus comprises a wooden or other tank 1 rectangular in section, provided with zinc electrodes 2, carbon electrodes 3 and aluminium electrodes 4. These are connected either to bus-bars or to the respective line wires 5, 6, 7, of a three phase line delivering about between 4 to 10 amperes of current per sq. cm. of electrode surface. I use a 60 cycle 100 ampere dynamo machine, but employ only from 10 to 60 amperes it is capable of delivering, so as to operate within safe limits of the machine and according to the flow through the tank 1.

All the zinc electrodes 2 are connected to one phase 5, all the carbon electrodes 3 are connected to the second phase 6, and all the aluminum electrodes 4 are connected to the third phase 7.

The electrodes are staggered so as to form a zig-zag passage for the electrolyte, and are spaced approximately 50 cm. apart.

If upon the first run the juice shows by analysis insufficient purification, I either decrease the speed of flow or increase the number of electrodes in the trough.

The defecated juice is delivered through a trough 8 to one end of the tank 1, and passed between the electrodes in a zig-zag path from one end of the tank to the other, and the clear syrup flows out about mid-way of the height of the trough through a pipe 9.

The sediment passes through a slot 10 into an overflow chamber 11, while the scum accumulates behind the last electrode, and either passes through the spout 12 to the filter or is skimmed off, and other scum discharged to a filter.

The rate of flow of the juice through the zig-zag passage between the electrodes is about 5 meters per minute, and it should be sufficiently rapid to prevent both heating and the deposition of slimes on the electrodes. The velocity will vary somewhat with the composition and density of the juices, but with those juices with which I have had experience the minimum permissible speed has been one meter in five seconds.

The syrups and juices should preferably be slightly acid, sulfurous acid or phosphoric acid being a suitable acidulant. The acidulation increases the speed of separation and facilitates the passage of the current, so that a lower voltage may be used than could otherwise be done.

It is possible to get the same effect in a metallic tank stirred by a second electrode to give sufficient motion to the juice or syrup.

Heretofore it has not been practicable to produce sugar from sorghum, but by my process the sorghum juice is completely purified to give a clear juice that can be concentrated and crystallized the same as cane or beet sugar juices.

I thus decolorize the sugar juice and syrups and effect both purification and decoloration, thus eliminating the entire use of bone black.

I also treat the final molasses of sugar refineries by my process and obtain a much clearer crystallizable molasses, but the color is not entirely removed. This color is due to caramelization of some of the sugar during the boiling.

The soluble salts contained in the juice or syrup are by electrolytic action rendered insoluble.

The organic matters as gums, wax and colloids again become soluble if the temperature of the juices or syrups is too high, so that I cannot operate on very hot or boiling juices and syrups, and this temperature should be kept below about 71° centigrade.

I claim.

1. The method of purifying sugar juices and syrups which comprises subjecting said juices and syrups between electrodes to electric current supplied to said electrodes, there being sufficient movement of the juices to prevent substantial deposition on the electrodes.

2. The method of purifying sugar juices and syrups which comprises subjecting said juices and syrups between electrodes to alternating current supplied to said electrodes, there being sufficient movement of the juices to prevent substantial deposition on the electrodes.

3. The method of purifying sugar juices and syrups which comprises subjecting said juices and syrups while flowing, to the action of low voltage electric current between electrodes of carbon and metal.

4. The method of purifying sugar juices and syrups which comprises subjecting said juices and syrups while flowing to the action of low voltage alternating current between electrodes of carbon and metal.

5. The method of purifying sugar juices and syrups which comprises subjecting said juices and syrups while in a slightly acidulated condition and between electrodes to action of electric current supply to said electrodes there being sufficient movement of the juices to prevent substantial deposition on the electrodes.

6. The method of purifying sugar juices and syrups which comprises subjecting said juices and syrups while in a slightly acidulated condition and between electrodes to action of alternating current supply to said electrodes there being sufficient movement of the juices to prevent substantial deposition on the electrodes.

7. The method of purifying sugar juices and syrups which comprises subjecting said juices and syrups while in a slightly acidulated condition and while flowing to action of low voltage electric currents, between electrodes, the speed of flow being sufficient to prevent any substantial desposition on the electrodes.

8. The method of purifying sugar juices and syrups which comprises subjecting said juices and syrups while in a slightly acidulated condition and while flowing to action of low voltage electric currents, between electrodes, the speed of flow being sufficient to prevent any substantial deposition on the electrodes.

9. The method, which comprises flowing sugar juices and syrups between electrodes while supplying low voltage current, the rate of flow being sufficiently to prevent any substantial deposition of slimes on the electrodes.

10. The method, which comprises flowing sugar juices and syrups between electrodes while supplying low voltage current, the rate of flow being sufficient to prevent any substantial deposition of slimes on the electrodes.

11. The method, which comprises flowing sugar juices and syrups between carbon and metallic electrodes while supplying low voltage alternating current to said electrodes.

12. The method, which comprises flowing sugar juices and syrups between carbon, zinc and aluminum electrodes while supplying low voltage three-phase current to said electrodes.

13. The method, which comprises flowing sugar juices and syrups between carbon, zinc and aluminum electrodes while supplying low voltage three-phase current to said electrodes, and removing scum, clarified liquid and sediment from different levels.

In testimony that I claim the foregoing as my invention I have signed my name hereto.

ELIE DELAFOND.